(12) United States Patent
Wang

(10) Patent No.: US 9,467,671 B1
(45) Date of Patent: *Oct. 11, 2016

(54) AUTOMATIC WHITE BALANCING SYSTEM AND METHOD

(71) Applicant: SZ DJI TECHNOLOGY CO., LTD., Shenzhen, Guangdong (CN)

(72) Inventor: Mingyu Wang, Guangdong (CN)

(73) Assignee: SZ DJI Technology Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 14/974,493

(22) Filed: Dec. 18, 2015

Related U.S. Application Data

(63) Continuation of application No. 14/806,518, filed on Jul. 22, 2015, now Pat. No. 9,253,460.

(51) Int. Cl.
*H04N 9/73* (2006.01)
*H04N 5/232* (2006.01)

(52) U.S. Cl.
CPC ............ *H04N 9/73* (2013.01); *H04N 5/23203* (2013.01)

(58) Field of Classification Search
None
See application file for complete search history.

(56) References Cited

U.S. PATENT DOCUMENTS

| | | | |
|---|---|---|---|
| 4,739,394 A | 4/1988 | Oda et al. | |
| 6,573,932 B1 | 6/2003 | Adams et al. | |
| 6,727,943 B1 | 4/2004 | Juen | |
| 7,495,696 B2 | 2/2009 | Chikane et al. | |
| 7,995,111 B2 | 8/2011 | Nakayama et al. | |
| 8,013,908 B2 | 9/2011 | Chou | |
| 8,384,796 B2 | 2/2013 | Zhang | |
| 8,520,092 B2 | 8/2013 | Nakayama et al. | |
| 2002/0027601 A1 | 3/2002 | Nakayama et al. | |
| 2002/0101516 A1 | 8/2002 | Ikeda | |
| 2003/0058350 A1 | 3/2003 | Ishimaru et al. | |
| 2003/0058351 A1 | 3/2003 | Maeda | |

(Continued)

FOREIGN PATENT DOCUMENTS

| | | |
|---|---|---|
| CN | 102193285 A | 9/2011 |
| CN | 103929632 A | 7/2014 |
| WO | WO 2009/126398 A1 | 10/2009 |

OTHER PUBLICATIONS

WO, International Search Report and Written Opinion, PCT/CN2014/086739, Jun. 12, 2015.

(Continued)

*Primary Examiner* — Michael Osinski
(74) *Attorney, Agent, or Firm* — Orrick, Herrington & Sutcliffe LLP

(57) ABSTRACT

Systems for automatic white balancing (AWB) of a digital image and methods for making and using same. In response to a white balancing trigger, the relative positions of an image sensor and a reference region for white balancing are automatically adjusted such that the image sensor can acquire an image of the reference region. A white balance parameter reflecting the color temperature of the illuminating source is then computed and used to perform white balancing so as to remove color casts. The position of the reference region can be pre-recorded or scanned-for by the image sensor. The reference region can be rendered mobile so that it can be positioned within the image sensor's field-of-vision. The imaging systems can further include a gimbal that enables the image sensor to rotate about one or more axes. The present systems and methods are suitable for use, for example, by unmanned aerial vehicles (UAVs).

20 Claims, 19 Drawing Sheets

(56) References Cited

U.S. PATENT DOCUMENTS

| | | |
|---|---|---|
| 2003/0156206 A1 | 8/2003 | Ikeda et al. |
| 2004/0246348 A1 | 12/2004 | Takeshita |
| 2004/0264772 A1 | 12/2004 | Une |
| 2006/0045512 A1 | 3/2006 | Imamura et al. |
| 2006/0262659 A1 | 11/2006 | Kurosawa |
| 2007/0002150 A1 | 1/2007 | Abe |
| 2007/0064119 A1 | 3/2007 | Komiya et al. |
| 2008/0111896 A1 | 5/2008 | Yoshino et al. |
| 2009/0028431 A1 | 1/2009 | Sasaki et al. |
| 2009/0174790 A1 | 7/2009 | Gwak |
| 2009/0180689 A1* | 7/2009 | Komiya ............... H04N 1/603 382/167 |
| 2009/0207274 A1 | 8/2009 | Park et al. |
| 2009/0309995 A1 | 12/2009 | Xiong et al. |
| 2010/0033595 A1 | 2/2010 | Ajito |
| 2010/0053366 A1 | 3/2010 | Mizuno et al. |
| 2010/0245618 A1 | 9/2010 | Ajito |
| 2012/0257824 A1 | 10/2012 | Jang |
| 2013/0088623 A1 | 4/2013 | Ashida et al. |
| 2014/0168463 A1 | 6/2014 | Tamura |
| 2014/0192223 A1 | 7/2014 | Nakade et al. |
| 2014/0240533 A1 | 8/2014 | Hirooka et al. |
| 2015/0116535 A1 | 4/2015 | Wu et al. |
| 2015/0206468 A1 | 7/2015 | Wu |
| 2015/0348245 A1* | 12/2015 | Horiuchi ............... G06T 5/005 382/167 |
| 2016/0112654 A1* | 4/2016 | Seo ............... H04N 5/272 348/333.12 |

OTHER PUBLICATIONS

Vortex Media, Warmcard.com, Reference cards for white balance, Copyright 2014, http://www.warmcards.com/WC1.html.

Michael Tapes Design, WhiBal, Reference cards for white balancing, Copyright 2015, http://michaeltapedesign.com/whibal.html.

* cited by examiner

AUTOMATIC WHITE BALANCING SYSTEM AND METHOD

CROSS-REFERENCE TO RELATED APPLICATIONS

This application is a continuation of, and claims priority to, U.S. patent application Ser. No. 14/806,518, filed on Jul. 22, 2015, which is a continuation of, and claims priority to, PCT Patent Application Number PCT/CN2014/086739, which was filed on Sep. 17, 2014. The disclosures of U.S. patent application Ser. No. 14/806,518 and PCT Patent Application Number PCT/CN2014/086739 are herein incorporated by reference in their entireties and for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to digital image processing and more particularly, but not exclusively, to systems and methods for automatic white balancing.

BACKGROUND

White balancing is the process of removing unrealistic color cast from an image caused by the color temperature of the illumination source. Different illumination sources such as daylight, incandescent light, and fluorescent light have different power spectral distributions that can cause distortions in the colors of an image. Such distortions can, for example, result in a white object not appearing white under the color cast of the illumination source. For example, a low color temperature (for example, 2000K) illumination source may give an image a reddish cast, whereas a high color temperature (for example, 9000K) illumination source may give an image a bluish cast. Whereas human eyes can automatically adapt to the temperature color of the illumination, currently-available (or conventional) artificial image acquisition devices and methods (for example, image sensors used in cameras and camcorders) cannot adapt automatically and thus produce certain color cast artifacts because of the color temperature of the illumination source. By compensating for illumination through white balancing, resulting images have more realistic colors.

Commercially available digital cameras have white balancing functions that, for example, allow a user to choose a color temperature setting from a collection of pre-defined illumination settings (for example, incandescent, fluorescent, cloudy, flash, sunny, candlelight, etc.). Using a pre-defined illumination setting, however, can produce suboptimal results if actual lighting conditions do not match the illumination setting. Alternatively, various techniques are available to perform automatic white balancing (AWB)—that is, without user specification of the illumination setting. Such AWB techniques are necessarily based on the color composition of the image. It can be difficult and computationally intensive, however, to perform AWB without an external reference regarding the color temperature of the illumination source. Errors in AWB techniques can easily occur when the technique is unable to distinguish between an overall color cast caused by the illumination source versus the intrinsic color bias of the composition of the scene.

For example, the commonly-used AWB technique known as "gray world" assumes that the average color in a scene is gray or colorless. The gray world technique can be effective when the scene contains a multitude of colors that average out to gray. But, the gray world technique can introduce significant color bias when the average color of a scene is not gray. This problem is particularly acute in non-gray monochromatic scenes (for example, scenes of a blue ocean or green foliage). Another AWB technique, the "max-RGB" method, assumes that the combination of maxima obtained from each of the three color channels red, green, and blue is the color of the illumination source. The max-RGB method is more effective than the gray world method for monochromatic scenes, but the effectiveness of the max-RGB method is highly dependent on the scene composition. Other white balancing algorithms have similar limitations. Furthermore, some algorithms that have high computational complexity (for example, because they require a large number of differential operations) are unsuitable for practical use, particularly for real-time video processing.

In view of the foregoing, there is a need for improved white balancing systems and methods that perform accurate white balancing for various types of image compositions while being computationally efficient.

Figure 1:
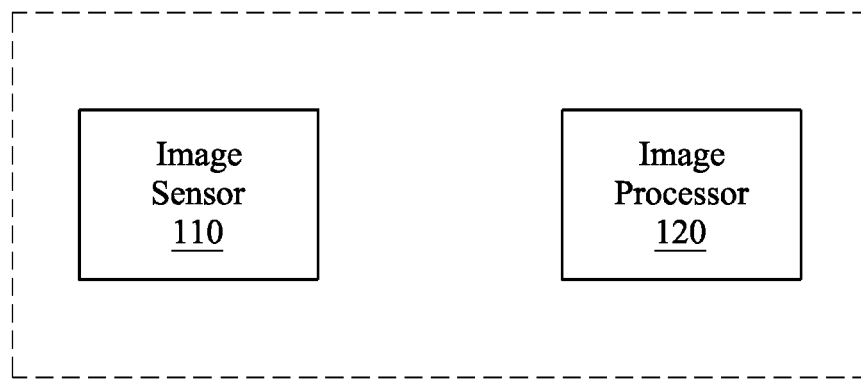
FIG. 1 is an exemplary top-level block diagram illustrating an embodiment of an imaging system for automatic white balancing of a digital image.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE
PREFERRED EMBODIMENTS

The present disclosure sets forth systems and methods for white balancing a digital image which overcome the limitations of existing white balancing techniques by enabling automatic white balancing using a reference region.

Turning now to FIG. 1, an exemplary imaging system 100 is shown as including an image sensor 110 and an image processor 120. The image sensor 110 can perform the function of sensing light and converting the sensed light into electronic signals that can be ultimately rendered as an image. Various image sensors 110 are suitable for use with the disclosed systems and methods, including, but not limited to, commercially-available cameras and camcorders. Suitable image sensors 110 can include analog image sensors (for example, video camera tubes) and/or digital image sensors (for example, charge-coupled device (CCD), complementary metal-oxide-semiconductor (CMOS), N-type metal-oxide-semiconductor (NMOS) image sensors, and hybrids/variants thereof). Digital image sensors, for example, can include a two-dimensional array of photosensor elements that can each capture one pixel of image information. The image sensor 110 preferably has a resolution of at least 0.1 Megapixels, 0.5 Megapixels, 1 Megapixels, 2 Megapixels, 5 Megapixels, 10 Megapixels, or an even greater number of pixels. The image sensor 110 can also include apparatus that separates and/or filters the sensed light based on color and directs the light onto the appropriate photosensor elements. For example, the image sensor 110 can include a color filter array that passes red, green, or blue light to selected pixel sensors and forms an interlaced color mosaic grid in a Bayer pattern. Alternatively, for example, image sensor 110 can include an array of layered pixel photosensor elements that separates light of different wavelengths based on the properties of the photosensor elements. Image sensor 110 can have specialty functions for use in various applications such as thermography, creation of multi-spectral images, infrared detection, gamma detection, x-ray detection, and the like. Image sensor 110 can include, for example, electro-optical sensors, thermal/infrared sensors, color or monochrome sensors, multi-spectral imaging sensors, spectrophotometers, spectrometers, thermometers, and illuminometers.

The image processor 120 can include any processing hardware needed to perform the automatic white balancing functions and operations described herein. Without limitation, the image processor 120 can include one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like. In certain embodiments, the image processor 120 can include an image processing engine or media processing unit, which can include specialized hardware for enhancing the speed and efficiency of certain operations for image capture, filtering, and processing. Such operations include, for example, Bayer transformations, demosaicing operations, noise reduction operations, and/or image sharpening/softening operations. In certain embodiments, the image processor 120 can include specialized hardware for performing white balancing operations. White balancing operations include, but are not limited to, determining whether an image can benefit from a reference region 130 (shown in FIGS. 2-4) for white balancing, acquiring an image of the reference region 130 for white balancing, processing the image of the reference region 130 for white balancing, computing a parameter for white balancing from the image of the reference region 130, and white balancing an image using the parameter for white balancing.

In some embodiments, the imaging system 100 can include one or more additional hardware components (not shown), as needed, for white balancing or other operations of the imaging system 100. Exemplary additional hardware components include, but are not limited to, memories (for example, a random access memory (RAM), static RAM, dynamic RAM, read-only memory (ROM), programmable ROM, erasable programmable ROM, electrically erasable programmable ROM, flash memory, secure digital (SD) card, etc.), and/or one or more input/output interfaces (for example, universal serial bus (USB), digital visual interface (DVI), display port, serial ATA (SATA), IEEE 1394 interface (also known as FireWire), serial, video graphics array (VGA), super video graphics array (SVGA), small computer system interface (SCSI), high-definition multimedia interface (HDMI), audio ports, and/or proprietary input/output interfaces). Without limitation, one or more input/output devices (for example, buttons, a keyboard, keypad, trackball, displays, and a monitor) can also be included in the imaging system 100 if needed.

In some embodiments, the imaging system 100 is configured so that the white balancing process is minimally disruptive to the image acquisition process. Stated somewhat differently, the imaging system 100 can be configured to minimize a "blackout" period during which the imaging of a scene of interest 105 (shown in FIGS. 2-4) is interrupted to image a reference region 130 for white balancing. In some embodiments where the image sensor 110 is moved from an original vantage point on a scene of interest 105 to focus on the reference region 130 and then moved back to the original vantage point, the total movement time of the image sensor 110 is preferably less than 10 seconds, 5 seconds, 2 seconds, 1 second, or less. The time needed to restore the original vantage point depends on the amount of movement that the image sensor 110 undertakes, the speed of motion of the image sensor 110, the time needed to acquire an image of the reference region 130, and/or other factors. In embodiments where the image sensor 110 is not moved (for example, where the reference region 130 is moved in front of the field-of-vision of the image sensor 110), some disruption of the normal image acquisition process can still occur, and it is desirable that such disruptions occur for no more than 5 seconds, 2 seconds, 1 second, or less.

When normal imaging operations are disrupted to perform white balancing, the images acquired during the white balancing process can be removed from the stream of images outputted from the imaging system 100 to an external system (not shown) or user (not shown). For example, during the "blackout" period described above, the user can be informed that the imaging system 100 is currently undergoing white balancing but that a normal image feed will resume within a specified time. Alternatively, the images acquired during the white balancing process can be part of an unfiltered/uninterrupted image feed. In other words, the images outputted to the external system or user can show that the imaging system 100 is undergoing white balancing.

Figure 2:
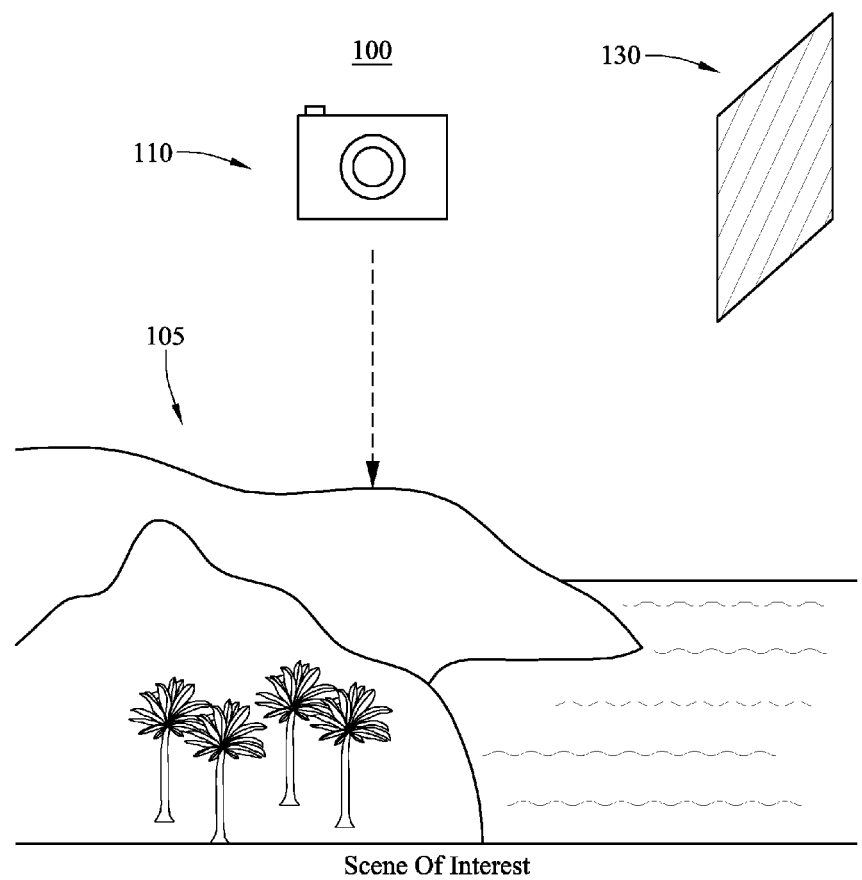
FIG. 2 is an exemplary diagram illustrating an embodiment of the imaging system of FIG. 1, wherein the imaging system includes a reference region and an image sensor being directed toward a scene of interest.

Turning now to FIG. 2, an exemplary embodiment of an imaging system 100 is shown as using a reference region 130 to perform white balancing. The reference region 130 preferably has a color suitable for white balancing, for example, a white, middle gray, or other gray tone color. The reference region 130 is preferably, but not necessarily, homogeneous in color. Flatness of the reference region 130 is preferable, though not essential, to avoid variations attributable to differential light scattering. The optical properties of the reference region 130 need not be ideal for purposes of white balancing. Post-processing (for example, using software and/or hardware) of images of the reference region 130 can correct artifacts attributable to non-ideal properties of the reference region 130 to accurately gauge the color temperature of an illumination source despite such non-ideal properties. The reference region 130 can be made of one or more of a variety of materials such as plastic, paper, metal, wood, foam, composites thereof, and other materials. Furthermore, the color, reflectance, and/or other optical properties of the reference region 130 can advantageously be calibrated as desired using an appropriate paint or other coating. As illustrated in FIG. 2, the image sensor 110 has a field-of-vision that is occupied by a scene of interest 105. The reference region 130 can be coupled with the imaging device 100 and/or unattached to the imaging device 100.

Figure 3:
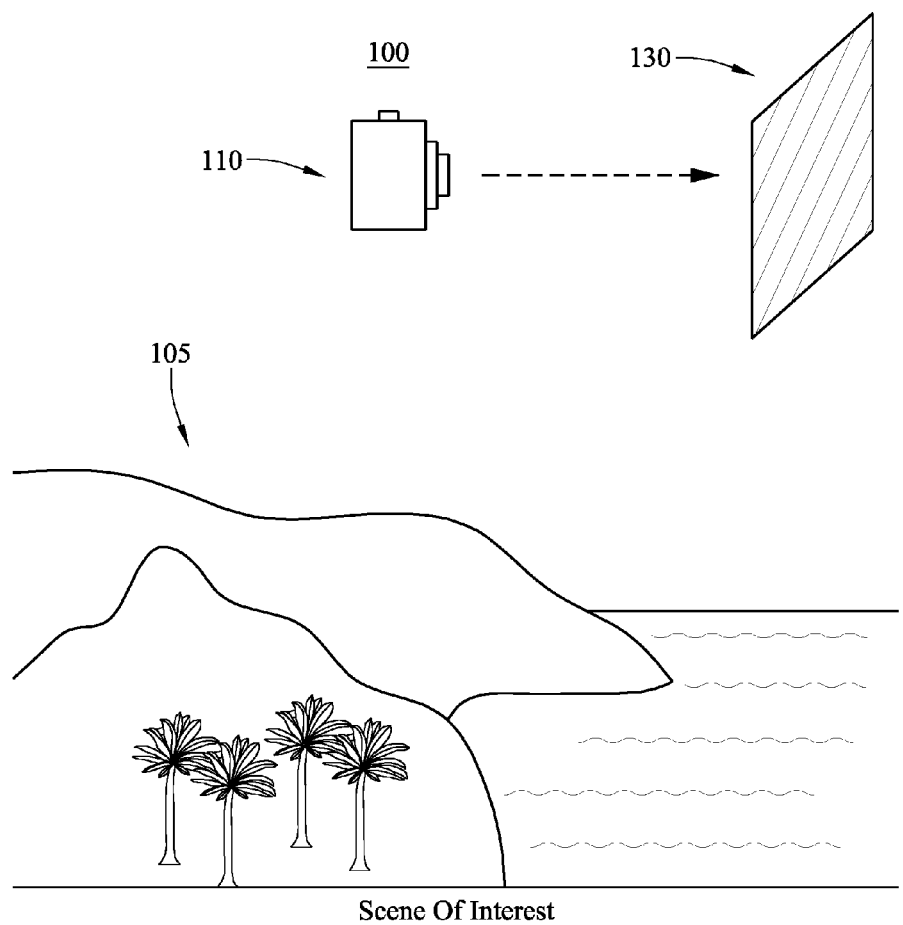
FIG. 3 is an exemplary diagram illustrating an alternative embodiment of the imaging system of FIG. 2, wherein the image sensor is directed toward the reference region.

In FIG. 3, the embodiment of the imaging system 100 of FIG. 2 is shown in an alternative configuration. To perform white balancing, image sensor 110 is shown as having been moved (via translational or rotational motion) so that the reference region 130 is situated within a field-of-vision of the image sensor 110.

Figure 4:
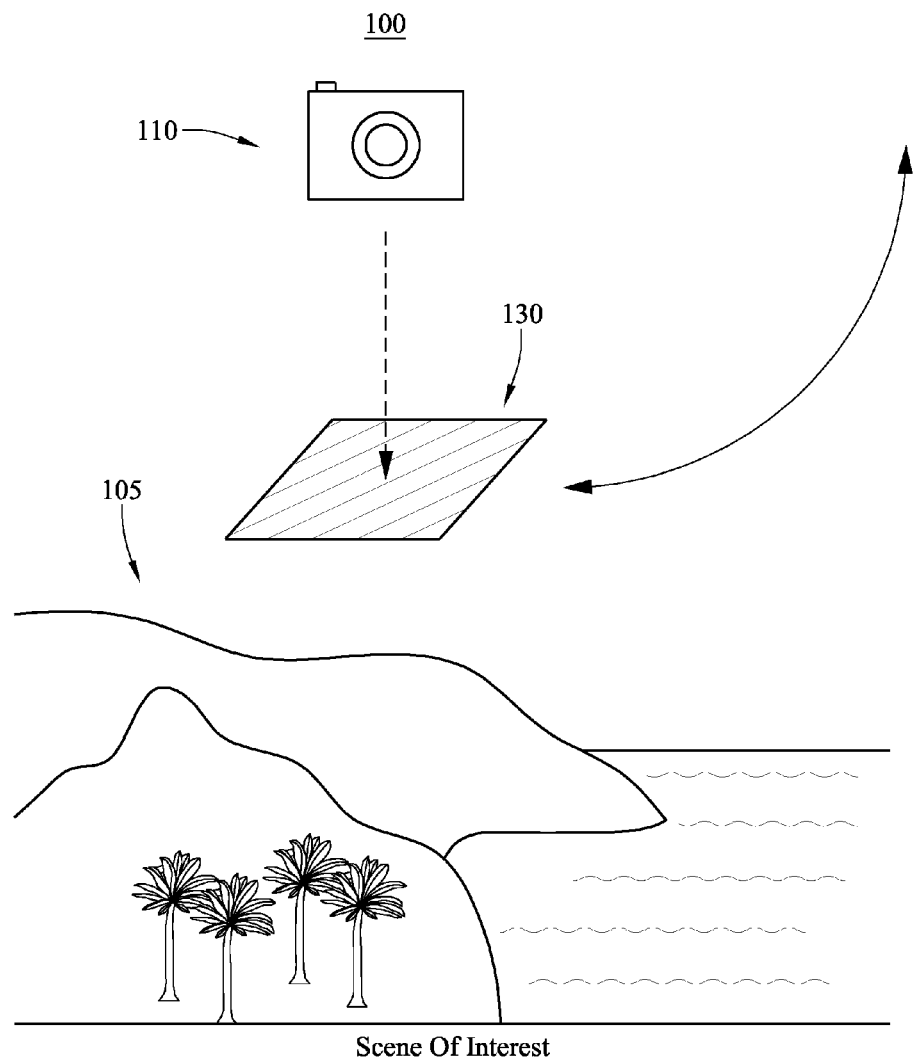
FIG. 4 is an exemplary diagram illustrating another alternative embodiment of the imaging system of FIG. 2, wherein the reference region is positioned within a field-of-vision of the image sensor.

In FIG. 4, the embodiment of the imaging system 100 of FIG. 2 is shown in another alternative configuration. To perform white balancing, the image sensor 110 is shown as remaining immobile while the reference region 130 is shown as having been moved (via translational and/or rotational motion) into the field-of-vision of the image sensor 110. As FIGS. 2-4 collective illustrate, either the image sensor 110 and/or the reference region 130 can be moved relative to each other in any conventional manner, including translationally and/or rotationally, so that the image sensor 110 is positioned to acquire an image of the reference region 130.

Figure 5:
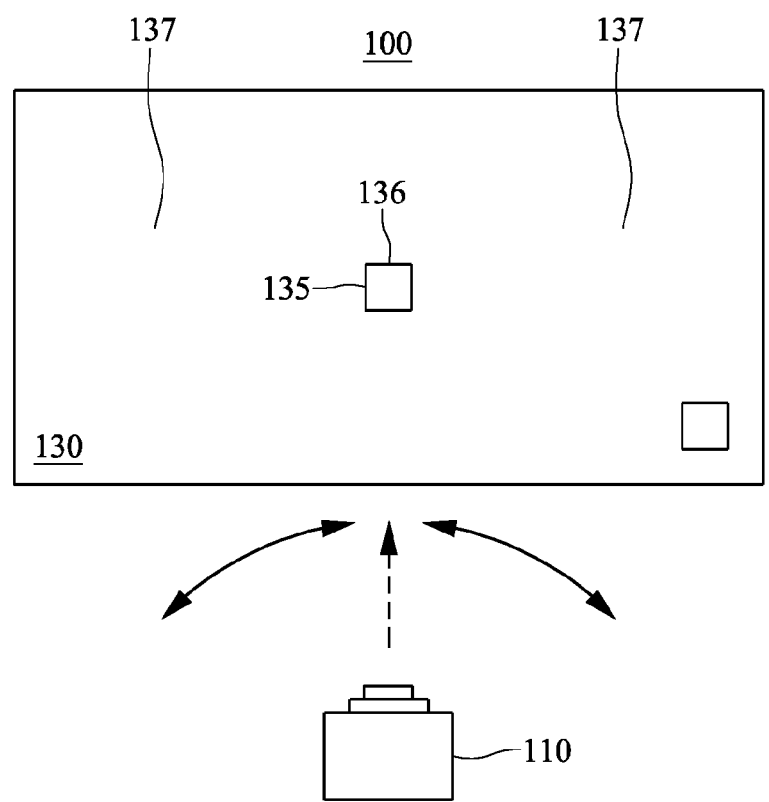
FIG. 5 is an exemplary diagram illustrating an embodiment of the reference region of FIGS. 2-4, wherein the reference region includes a marker for locating the reference region.

Turning now to FIG. 5, an exemplary embodiment of an imaging system 100 is shown as performing white balancing using a reference region 130 and one or more markers 135. The one or more markers 135 can be used to designate a position of the reference region 130 and/or convey additional information regarding the white balancing process through information encoded by the markers 135. Preferably, each marker 135 is easily distinguished from the periphery 137 of the marker 135 in the reference region 130. For example, the marker 135 can have a color having a high contrast with the color of periphery 137. Alternatively and/or additionally, the marker 135 can have a pattern that can be recognized by image sensor 110. In some embodiments, the marker 135 can encode information that can be used, for example, to further delineate the reference region 130. In a preferred embodiment, the marker 135 can include a quick response (QR) code, a two-dimensional barcode containing machine-readable information. The QR code can include dark-colored modules arranged in a square grid, preferably on a background 136 that provides color contrast. An image sensor 110 can "read" the QR code, and an image processor 120 (shown in FIG. 1) can decipher information encoded by the QR code.

In FIG. 5, a reference region 130 is shown as being designated by a single marker 135 located at the center of the reference region 130. As described in additional detail below with reference to FIG. 17, the image sensor 110 can scan the surroundings of the image sensor 110 to locate the marker 135. Once the marker 135 is located, the image sensor 110 can acquire an image of a peripheral area 137 surrounding the marker 135 for white balancing. Where the marker 135 includes a QR code or other pattern that encodes information, the encoded information can be used to furnish additional details regarding white balancing (for example, the size, boundaries, or topography of the reference region 130).

Figure 6:
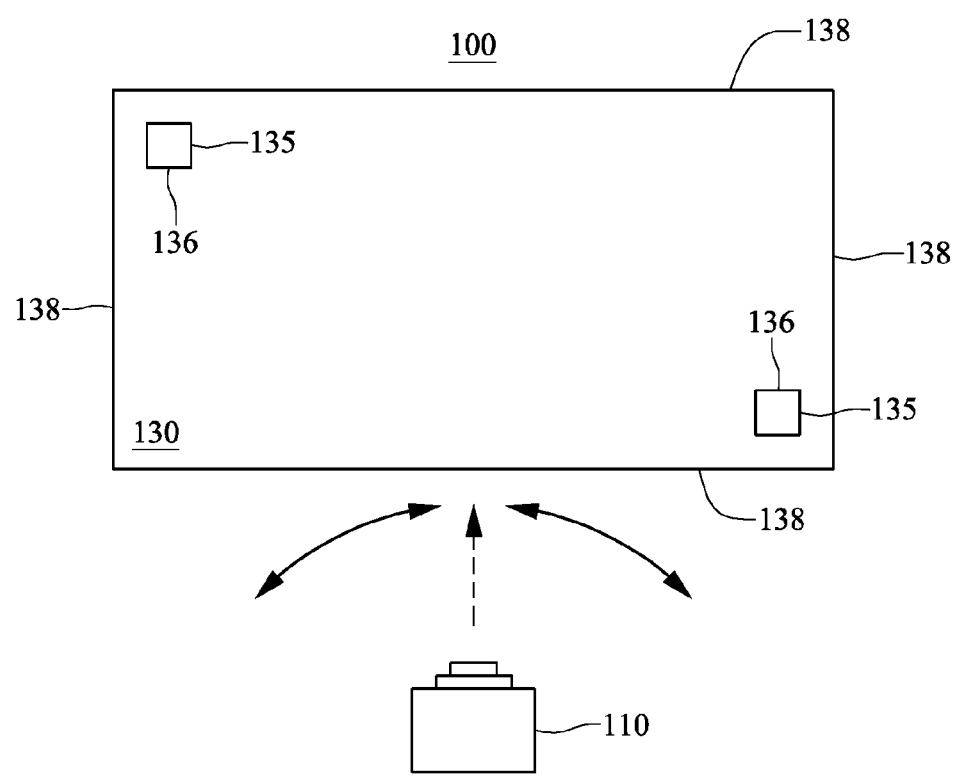
FIG. 6 is an exemplary diagram illustrating an alternative embodiment of the reference region of FIG. 5, wherein the reference region includes multiple markers for locating the reference region.

Turning now to FIG. 6, an alternative exemplary embodiment of an imaging system 100 is shown as performing white balancing using a reference region 130 and multiple markers 135. The multiple markers 135 can, for example, delimit one or more boundaries 138 of the reference region 130 (as further described below with reference to FIG. 17). In both FIGS. 5 and 6, the image sensor 110 can move in any conventional manner, including rotationally and/or translationally, relative to the reference region 130 to scan for the marker 135 (as further described below with reference to FIG. 17).

Figure 7:
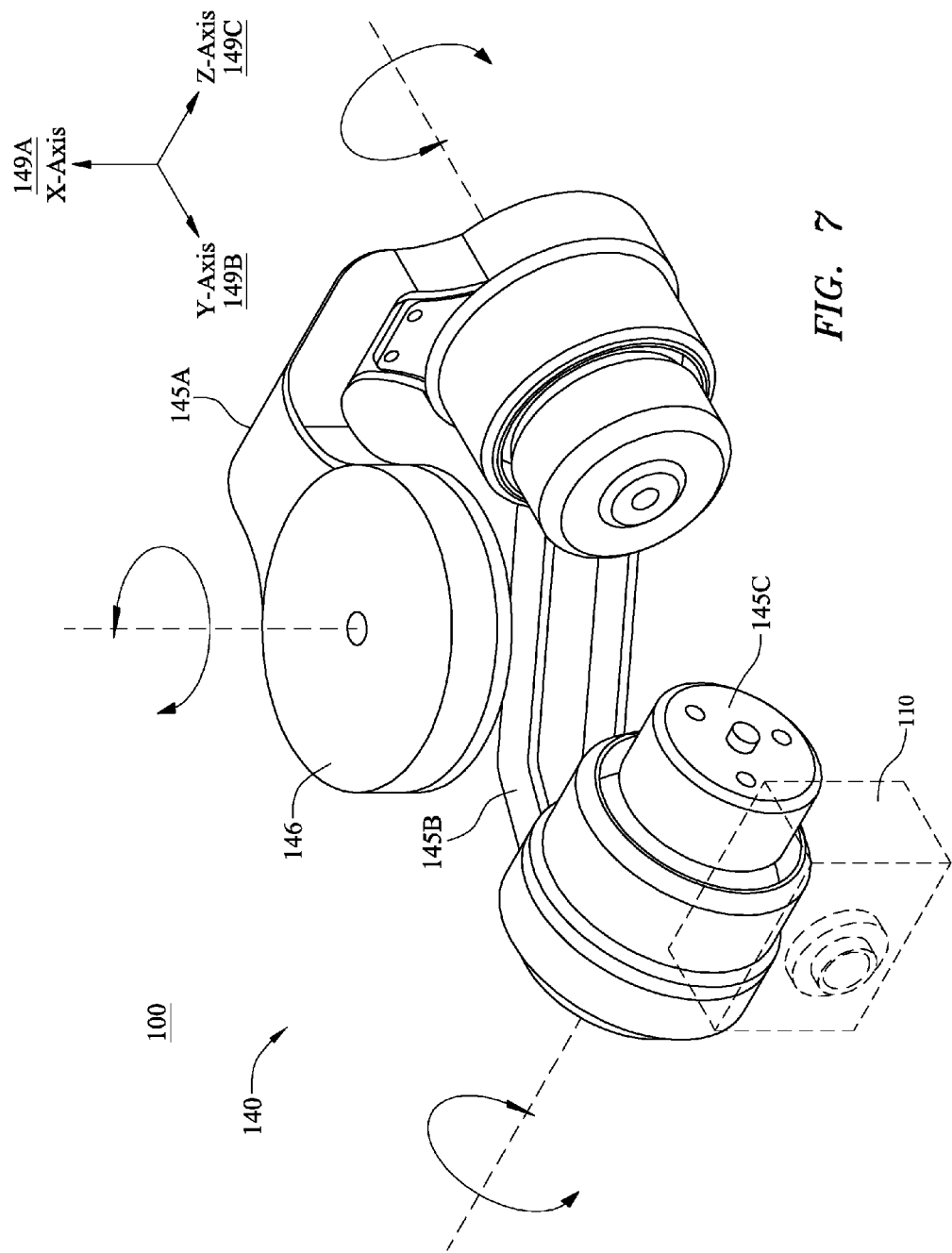
FIG. 7 is an exemplary diagram illustrating an embodiment of an imaging system having an image sensor and a gimbal mechanism.

In FIG. 7, an exemplary embodiment of an imaging system 100 is shown as including an image sensor 110 that can be attached to a gimbal mechanism 140 that enables rotation of the image sensor 110 about at least one axis 149. The gimbal mechanism 140 can include one or more pivoted supports 145 that are mounted with respect to one or more axes 149 of rotation, thereby allowing the image sensor 110 to be rotationally independent with respect to a fixture 146 to which the gimbal mechanism 140 is attached. An exemplary gimbal mechanism 140 is shown as including a first pivoted support 145A, a second pivoted support 145B, and a third pivoted support 145C that support the image sensor 110 with respect to the fixture 146. The first pivoted support 145A can be mounted to the fixture 146 and can be configured to rotate about an x-axis 149A perpendicular to the fixture 146. The second pivoted support 145B can be mounted to the first pivoted support 145A and can be configured to rotate about a y-axis 149B perpendicular to the x-axis 149A. The third pivoted support 145C can be mounted to the second pivoted support 145B and can be configured to rotate about a z-axis 149C perpendicular to the x-axis 149A and the y-axis 149B. Finally, the image sensor 110 can be mounted to the third pivoted support 145C. Pivoted supports 145 need not be directly mounted to the fixture 146, the image sensor 110, or to other pivoted supports 145. Instead, pivoted supports 145 can optionally be indirectly mounted to the fixture 146, the image sensor 110, or to other pivoted supports 145 (for example, through one or more spacer portions (not shown)).

Figure 8:
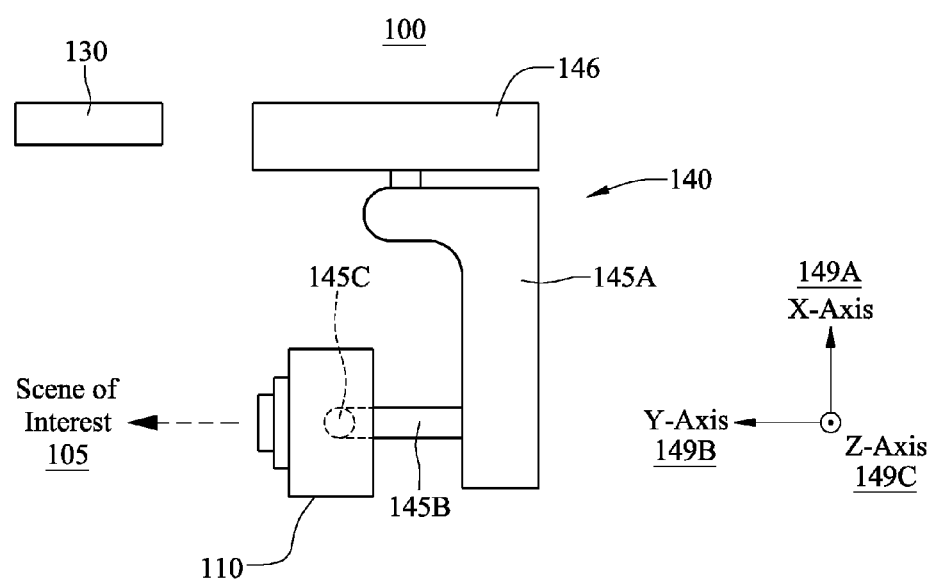
FIG. 8 is an exemplary diagram illustrating a side view of the imaging system of FIG. 7, wherein the image sensor is directed toward a scene of interest.
Figure 9:
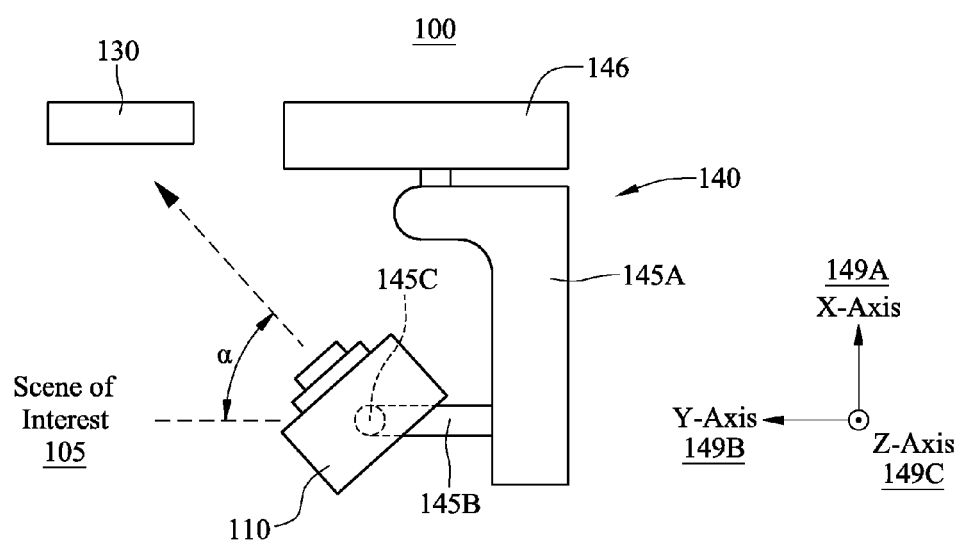
FIG. 9 is an exemplary diagram illustrating a side view of the imaging system of FIG. 7, wherein the image sensor is directed toward a reference region.

The manner of configuring and mounting the pivoted supports 145 in the gimbal mechanism 140 can vary and can include, for example, concentric ring structures and non-ring structures shown in FIGS. 7-9. Depending on the number of degrees of rotational freedom desired, gimbal mechanism 140 can include any suitable number, including one, two, or three, pivoted supports 145. Furthermore, although the pivoted supports 145A, 145B, and 145C are shown as rotating about mutually perpendicular axes of rotation (for example, the x-axis 149A, the y-axis 149B, and the z-axis 149C) for purposes of illustration only, the pivoted supports 145 need not be configured to rotate about mutually perpendicular axes of rotation. The gimbal mechanism 140 can include various mechanical apparatus as needed, such as ball bearings, tracks, actuators, and the like. For example, one or more rotors can be used to rotate each pivoted support 145 by a desired angle α. The gimbal mechanism 140 can be configured to respond to rotational commands from the image processor 120 directing movement of image sensor 110 to locate a reference region 130 for white balancing.

In FIG. 8 (showing a side view of FIG. 7), the image sensor 110 is shown as being directed toward a scene of interest 105, and the reference region 130 is shown as being situated outside of the field-of-vision of the image sensor 110.

In FIG. 9 (showing a similar side view as FIG. 8), after responding to a trigger for white balancing, the gimbal mechanism 140 is shown as rotated about the z-axis 149C upwards by an angle α so that the reference region 130 is situated within the field-of-vision of the image sensor 110.

Although shown and described as having three pivoted supports 145 for purposes of illustration only, the gimbal mechanism 140 can include any suitable number of pivoted supports 145 for providing any number of degrees of freedom. Furthermore, although shown in FIG. 9 as rotating about the z-axis 149C for purposes of illustration only, the image sensor 110 can be rotated about any combination of the x-axis 149A, the y-axis 149B, and/or the z-axis 149C as needed to acquire an image of the reference region 130. In addition to being moved rotationally, the image sensor 110 can also be moved translationally as needed to acquire an image of the reference region 130.

Figure 10:
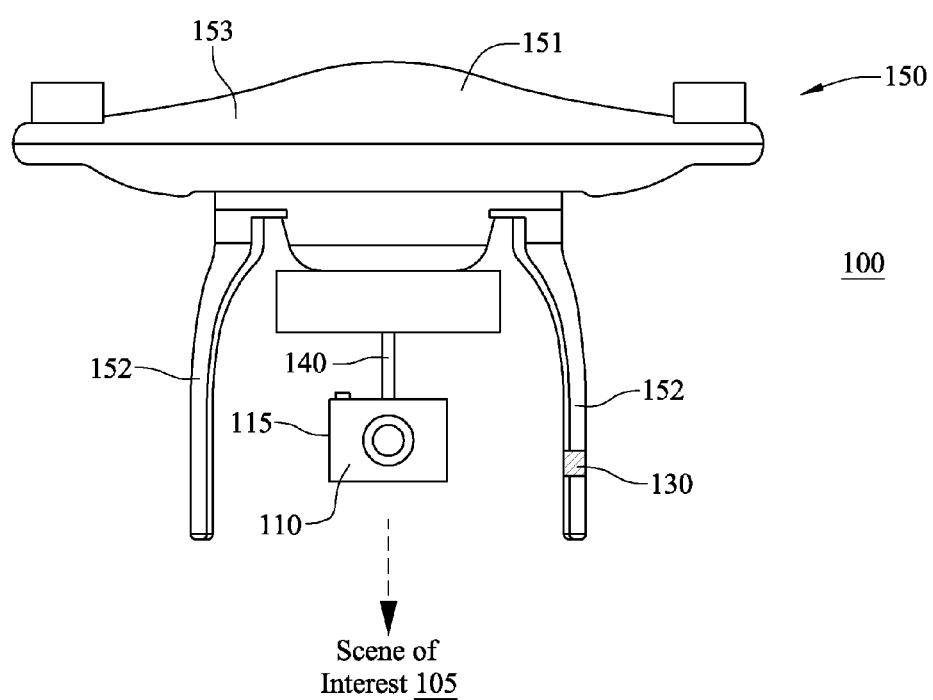
FIG. 10 is an exemplary diagram illustrating an embodiment of an imaging system including an unmanned aerial vehicle (UAV), wherein an image sensor is directed toward a scene of interest.
Figure 11:
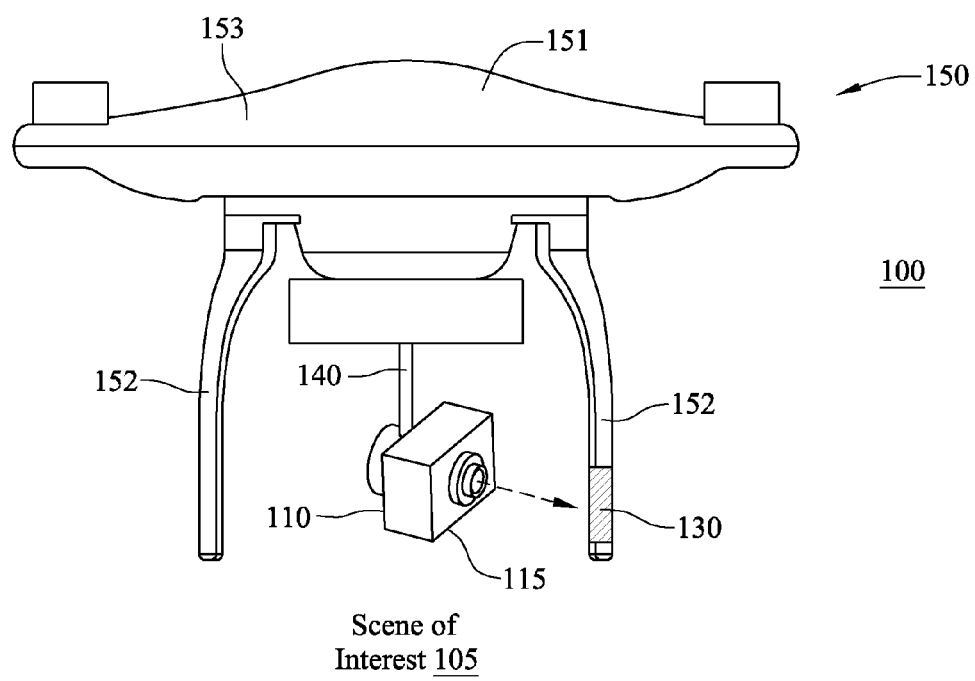
FIG. 11 is an exemplary diagram illustrating the imaging system of FIG. 10, wherein the image sensor is directed toward a reference region on the UAV.

In FIGS. 10-11, an exemplary embodiment of an imaging system 100 is shown as including an unmanned aerial vehicle (UAV) 150. UAVs 150, colloquially referred to as "drones," are aircraft without a human pilot onboard the vehicle whose flight is controlled autonomously or by a remote pilot (or sometimes both). UAVs are now finding increased usage in civilian applications that require various forms of aerial data-gathering. Various types of UAVs 150 are suitable for use with the disclosed systems and methods. One suitable type of UAV 150, for example, is an aerial rotorcraft that is propelled by multiple rotors. One suitable rotorcraft has four rotors and is known as a quadcopter, quadrotor helicopter, or quad rotor. Exemplary quadcopters suitable for the virtual sightseeing systems and methods include numerous models currently available commercially. UAVs 150 suitable for the present systems and methods include, but are not limited to, other rotor designs such as single rotor, dual rotor, trirotor, hexarotor, and octorotor designs. Fixed wing UAVs 150 and hybrid rotorcraft-fixed wing UAVs 150 can also be used. UAV 150 can include, for example, a fuselage 151 and one or more landing apparatus 152. Although shown and described with respect to a UAV 150 for purposes of illustration only, the imaging system 100 can include, or be mounted on, any type of mobile platform. Exemplary suitable mobile platforms include, but are not limited to, bicycles, automobiles, trucks, ships, boats, trains, helicopters, aircraft, various hybrids thereof, and the like.

UAV 150 can be especially configured in hardware and/or software to perform automatic white balancing. For example, an image sensor 110 can be a UAV camera 115 especially adapted for use in an UAV 150. The UAV camera 115 is preferably lightweight so as to avoid over-encumbering the UAV 150. The UAV camera 115 advantageously can have a high range of motion so as to maximize the image capture capability of the UAV camera 115.

In FIGS. 10-11, a gimbal mechanism 140 is shown as disposed on a surface of the fuselage 151 of the UAV 150. The image sensor 110 is attached to the gimbal mechanism 140, allowing the image sensor 110 rotational freedom about one or more axes with respect to the fuselage 151.

In FIG. 10, the image sensor 110 is shown as pointing toward a scene of interest 105, and a field-of-vision of the image sensor 110 is preferably not obstructed by a portion of the UAV 150. In FIG. 11, after receiving a command/trigger to perform white balancing, the image sensor 110 is shown as having rotated using the gimbal mechanism 140 such that a reference region 130 for white balancing is within the field-of-vision of the image sensor 110. In the embodiment illustrated in FIG. 11, the reference region 130 is shown as being located on a landing apparatus 152. Although the reference region 130 is shown in FIG. 11 as being located on the landing apparatus 152 for illustrative purposes only, the reference region 130 can be located on any portion of the UAV 150 (for example, on the fuselage 151) that can be imaged by the image sensor 110. The reference region 130 may or may not need to be designated with the imaging system 100 in advance of imaging the scene of interest 105. For example, if the fuselage 151, landing apparatus 152, and/or other portions of the UAV 150 are of a color suitable for white balancing (for example, white, middle gray or other gray tone), then the image sensor 110 need only point to that portion of the UAV 150. The image sensor 110 can locate a suitable portion of the UAV 150 for white balancing by scanning the surroundings of the image sensor 110, as further described below with reference to FIG. 17. Alternatively, a location of the reference region 130 can be designated with the imaging system 100 in advance of imaging the scene of interest 105. After such designation occurs, the image sensor 110 can be programmed or otherwise enabled to move according to the designated location so that reference region 130 is within the field-of-vision of image sensor 110. In embodiments in which UAV 150 is not uniformly a color suitable for white balancing, the location of the reference region 130 is preferably designated with the imaging system 100 in advance of imaging the scene of interest 105.

Figure 12:
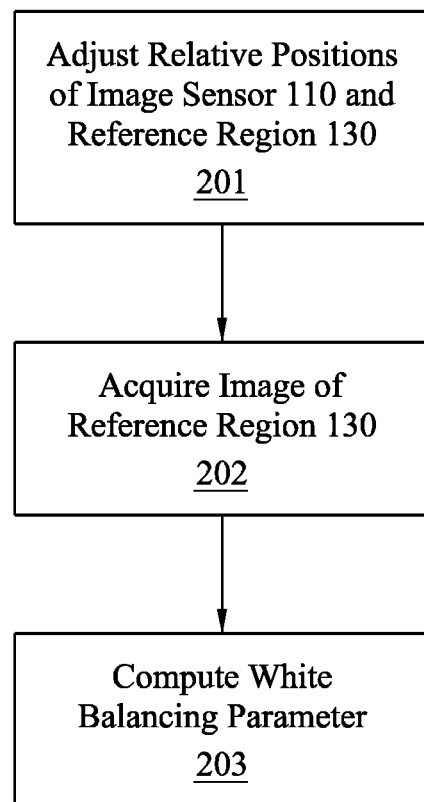
FIG. 12 is an exemplary top level flow chart illustrating an embodiment of a method for automatic white balancing of a digital image.

In FIG. 12, an embodiment of a top-level method 200 for automatic white balancing of a digital image is shown. In one embodiment, the imaging system 100 of FIG. 1 can be used to perform method 200. At 201, in response to a white balancing trigger, the relative positions of an image sensor 110 and a reference region 130 having a suitable color for white balancing are adjusted so that the image sensor 110 is positioned to acquire an image of the reference region 130. In certain embodiments, the adjusting, at 201, of the relative positions of the image sensor 110 and the reference region 130 can be performed automatically in response to the white balancing trigger, as further discussed below in connection with FIG. 13. For example, in response to a white balancing trigger, the imaging system 100 can activate a mechanism which automatically repositions the image sensor 110 so that the reference region 130 is within the field-of-vision of the image sensor 110. Alternatively and/or additionally, the reference region 130 can be automatically moved so that the reference region 130 is within the field-of-vision of the image sensor 110. The latter may be preferable when the image sensor 110 cannot be moved or when such movement is undesirable.

At 202, an image of the reference region 130 is acquired using the image sensor 110. In certain embodiments, the image acquisition, at 202, can be performed automatically. For example, the image acquisition can be performed in response to the image sensor 110 and/or the reference region 130 being positioned so that the reference region 130 is within the field-of-vision of the image sensor 110. Alternatively and/or additionally, the image sensor 110 can be configured to dynamically assess an image acquired by the image sensor 110 as the image sensor 110 scans the surrounds of the image sensor 110 for the reference region 130. After the image sensor 110 recognizes that an acquired image is an image of the reference region 130, the acquired image can be used for subsequent white balancing. Recognition of the reference region 130 during scanning can occur based on the color and color distribution of the image acquired by the image sensor 110. Alternatively and/or additionally, recognition of the reference region 130 can be based on comparison with images previously acquired by the image sensor 130 or other image preloaded into the imaging system 100. For example, an image can be compared to a previously acquired image of the reference region 130. If the image is similar to the previously acquired image of the reference region 130 (for example, based on the color and/or composition of the two images), then the imaging system 100 can conclude that the reference region 130 has been found.

After the image of the reference region 130 is acquired, the positions of the image sensor 110 and/or the reference region 130 prior to when white balancing was triggered can be restored. This restoration of the prior positions of the image sensor 110 and/or the reference region 130 can take place automatically. For example, an image processor 120 (shown in FIG. 1) can be configured to remember the prior positions and restore these prior positions after the image sensor 110 has acquired the image of reference region 130.

At 203, a parameter for white balancing a digital image is computed from the image of the reference region 130. The parameter for white balancing can be a parameter that reflects a color temperature of the source of illumination, as ascertained according to a color cast of the reference region 130. The parameter for white balancing can be expressed, for example, as a color temperature in degrees Kelvin. Lower color temperatures can represent a greater portion of red than blue in the illumination source; whereas, higher color temperatures can represent a greater portion of blue than red in the illumination source. Other parameters indicative of other properties of the illumination source can also used for white balancing. In some embodiments, multiple parameters for white balancing can be computed based on a single image of the reference region 130. For example, color temperatures of different portions of the reference region 130 can be computed in some instances where color heterogeneity is expected. In other instances, color temperatures corresponding to each pixel or group of pixels of the reference region 130 can be computed. In certain embodiments, the computing of the white balancing parameter can be performed automatically, for example, subsequent to acquisition of an image of the reference region 130 by the image sensor 110. For example, the image processor 120 can be configured by hardware and/or software to automatically initiate computational processes to obtain the white balancing parameter after receiving the image of the reference region 130.

Figure 13:
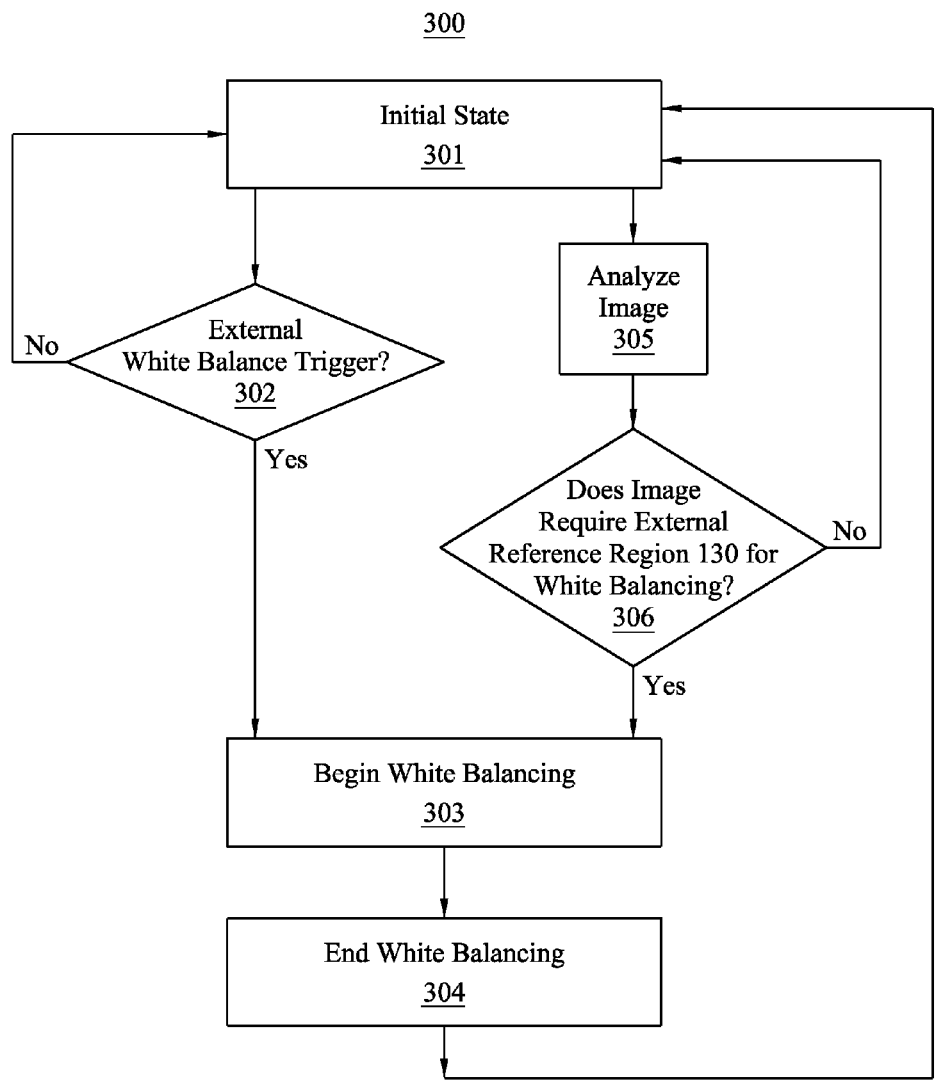
FIG. 13 is an exemplary flow chart illustrating an alternative embodiment of the method of FIG. 12, wherein the method includes triggering automatic white balancing of a digital image.

In FIG. 13, an exemplary flow diagram illustrating a method 300 of determining when white balancing is triggered is shown. At 301, an imaging system 100 (shown in FIG. 1) begins in an initial state where a white balancing has not yet been triggered, and image sensor 110 (shown in FIG. 1) is in the process of acquiring an image stream from a scene of interest 105 (shown in FIGS. 2-4). At 302, it is determined whether an external command to begin white balancing (for example, a user command or a command from an external system (not shown) that has determined that white balancing is required based on the color cast of prior images taken by image sensor 110) has been received. If no external white balancing command is received, initial state 301 is maintained. If an external white balancing command is received, at 302, white balancing is initiated at 303. White balancing proceeds until white balancing is completed, at 304. During the white balancing process, at 303 and 304, the image stream that the imaging system 100 sends externally can optionally be halted. After completion of white balancing, at 304, imaging system 100 returns to the initial state 301, where the image stream can be resumed if needed. If an additional white balancing command is received after white balancing is initiated at 303 but before white balancing is completed at 304, such a command can be ignored as redundant. Alternatively, the additional white balancing command can be buffered and relayed as a subsequent white balancing command after the prior white balancing process has been completed.

Alternatively and/or concurrently with the detection of an external white balancing trigger, at 305, white balancing can be triggered automatically by analyzing an image taken by the image sensor 110. At 306, whether the image taken requires white balancing using reference region 130 is analyzed. If it is determined, at 306, that the image does not require the reference region 130 for white balancing, then imaging system 100 is returned to initial state 301. If it is determined at 306 that the image requires the reference region 130 for white balancing, white balancing begins at step 303. A variety of criteria can be used in image assessment at 306, including determining whether the image lacks a region having a color suitable for white balancing, in which case an external reference region 130 is not needed. Such a determination is described in additional detail below with reference to FIG. 14.

Figure 14:
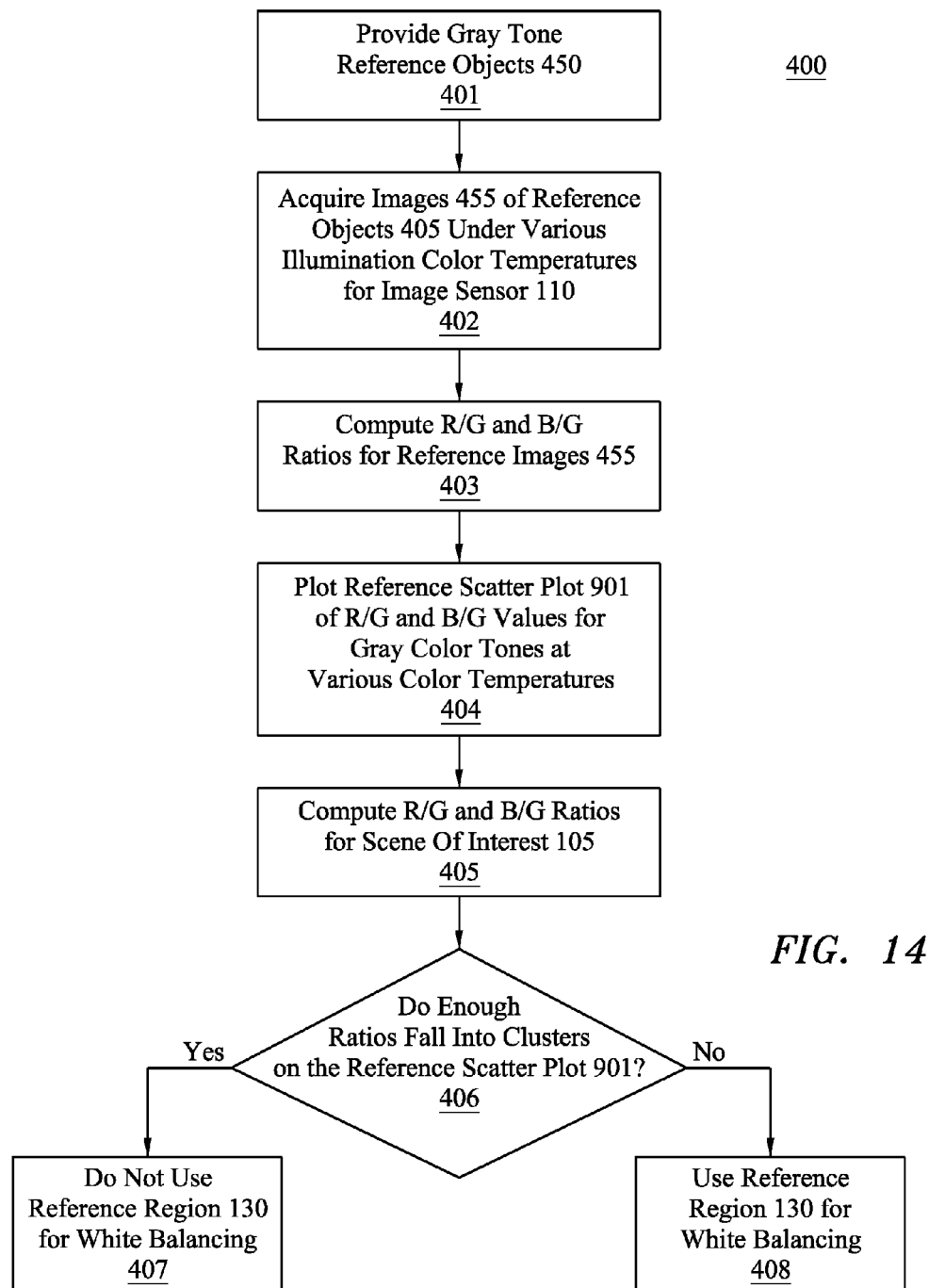
FIG. 14 is an exemplary detailed flow chart illustrating an embodiment of a method of determining whether an image contains a suitable region for white balancing with respect to the triggering illustrated in FIG. 13.

Turning now to FIG. 14, a detailed flow diagram of one embodiment of a method 400 of determining whether a digital image of interest contains a region having a suitable color for white balancing without needing to use a reference region 130 is shown. Method 400 is shown as making this determination by comparing the color ratios of a plurality of pixels of the digital image to color ratios of a plurality of pixels of a reference image. This embodiment is based on the fact that gray color tones have red-to-green and blue-to-green intensity ratios that are fixed within certain bounds under a given illumination color temperature. Accordingly, the gray tone pixels in the digital image of interest can be identified according to the combination of the red-to-green and blue-to-green intensity ratios of the pixels with reference to the same ratios on one or more reference images. In some embodiments, the method includes plotting the color ratios of the plurality of pixels of a reference image on a scatter plot, plotting the color ratios of the plurality of pixels of the digital image on the scatter plot, and comparing the plotted positions of the pixels of the digital image to the plotted positions of the pixels of the reference image.

For example, at 401, the image sensor 110 is prepared for white balancing by providing one or more reference objects 450 having a range of gray color tones (for example, from white to middle gray). The preparation of image sensor 110 is preferably performed prior to the time that the image sensor begins imaging a scene of interest 105 (shown in FIGS. 2-4). At 402, the image sensor 110 acquires reference images 455 of the reference objects 450 under a variety of illumination sources having different color temperatures (for example, at 2800K, 4000K, 5000K, 6500K, 7500K, etc.). At 403, red-to-green and blue-to-green color intensity ratios are computed from the acquired reference images 455. The red-to-green and blue-to-green color intensity ratios can be computed for individual pixels of the reference images 455. Alternatively and/or additionally, the red-to-green and blue-to-green color intensity ratios can be averaged over particular regions of the reference images 455. For example, the reference images 455 can be divided into blocks of a fixed width and height (for example, 10×10 pixels, 20×20 pixels, 50×50 pixels, or more) and the red-to-green and blue-to-green color intensity ratios averaged over each block, so that noise is removed within each block. In another example, red-to-green and blue-to-green color intensity ratios can be averaged only over particular pixels of the reference images 455 that meet a certain condition (for example, pixels not meeting certain color criteria can be removed from averaging). In yet another example, red-to-green and blue-to-green color intensity ratios can be averaged only over particular regions of the reference images 455 that meet a certain condition (for example, regions having too many pixels that do not meet certain color criteria can be removed).

Figure 15:
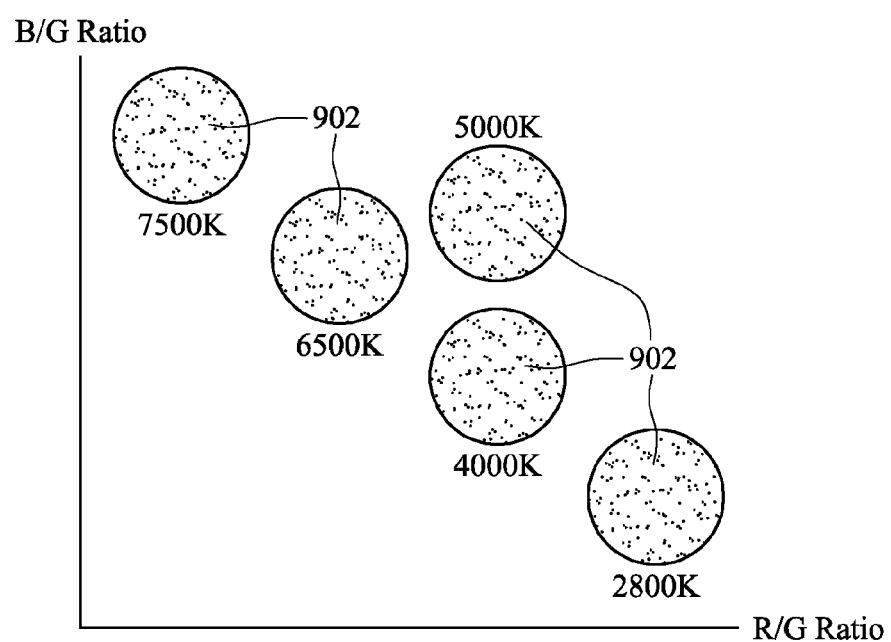
FIG. 15 is an exemplary diagram illustrating an embodiment of a method of determining whether an image contains a suitable region for white balancing with respect to the triggering illustrated in FIG. 13.

At 404, after the red-to-green and blue-to-green color intensity ratios are computed from the reference images 455, the distribution of the red-to-green and blue-to-green color ratios over the range of reference gray color tones and color temperatures are plotted on a reference scatter plot 901 (shown in FIG. 15) whose axes are the red-to-green color ratio (for example, on an x-axis) and the blue-to-green color ratio (for example, on a y-axis). An exemplary reference scatter plot 901 is shown in FIG. 15. On the reference scatter plot 901, the various gray tone pixels can form clusters 902 corresponding to the color temperature at which the pixels were generated (for example, pixels taken at a temperature of 2800K may tend to fall in the lower right of the scatter plot, while pixels taken at a temperature of 7500K may tend to fall in the upper left of the scatter plot). The reference scatter plot 901 can be generated prior to the time that the image sensor begins imaging a scene of interest 105, so that the reference scatter plot 901 can be used for white balancing during the imaging of the scene of interest 105.

Referring back to FIG. 14, after a scene of interest 105 has begun to be imaged, whether an image of the scene of interest 105 contains a region having a suitable color for white balancing without use of a reference region 130 is determined. To make such a determination, at 405, the red-to-green and blue-to-green color ratios of the pixels of the image of the scene of interest 105 are computed. Preferably, the computation of color ratios for the image of the scene of interest 105 is performed in the same or in a similar manner as the computation of color ratios for generating the reference scatter plot 901. At 406, whether the combination of these intensity ratios, when taken as coordinates, falls within a cluster in the reference scatter plot, and is hence a gray tone pixel itself, is determined. At 407, if a sufficient number or a sufficient fraction of pixels are gray tone, then the image has a suitable region for white balancing and does not need to use an external reference region 130 for white balancing. Otherwise, at 408, the image lacks a suitable region for white balancing and would benefit from use of an external reference region 130 for white balancing.

Figure 16:
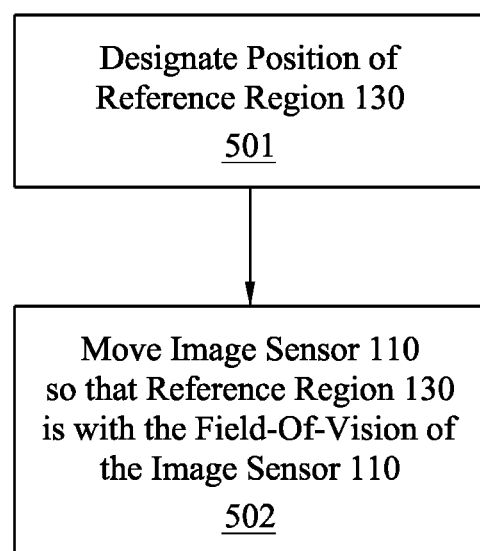
FIG. 16 is an exemplary flow chart illustrating an embodiment of the method of FIG. 12 for positioning an image sensor of the imaging system with respect to a reference region.

Turning now to FIG. 16, a method 500 for automatically moving an image sensor 110 so that a reference region 130 is within a field-of-vision of an image sensor 110 is shown. In this embodiment, a position of the reference region 130 is recorded by an image processor 120 (shown in FIG. 1) prior to when white balancing begins. At 501, the position of reference region 130 can be designated using one or more positional parameters such as the linear displacement of the reference region 130 relative to the image sensor 110 in one of three Cartesian coordinates. For example, the image processor 120 can record that the reference region 130 is twenty to thirty centimeters above and thirty to forty centimeters to the left of the image sensor 110. Alternatively and/or additionally, the position of reference region 130 can be designated using one or more angular (in other words, rotational) displacement parameters, which may be more suitable when movement of the image sensor 110 is controlled by a rotational mechanism (for example, a gimbal mechanism 140 described above in reference to FIGS. 7-9). For example, the image processor 120 can record that the reference region 130 can be located by moving the image sensor 110 by an angle φ of forty to forty-five degrees upward and an angle θ of twenty to twenty-five degrees to the left. At 502, one or more of the positional parameters can be used to adjust the position of the image sensor 110 via corresponding translational and/or rotational mechanisms (for example, gimbal mechanism 140) so that the reference region 130 is within the field-of-vision of the image sensor 110 (for example, moving the image sensor 110 by an angle φ of forty to forty-five degrees upward and an angle θ of twenty to twenty-five degrees to the left).

Figure 17:
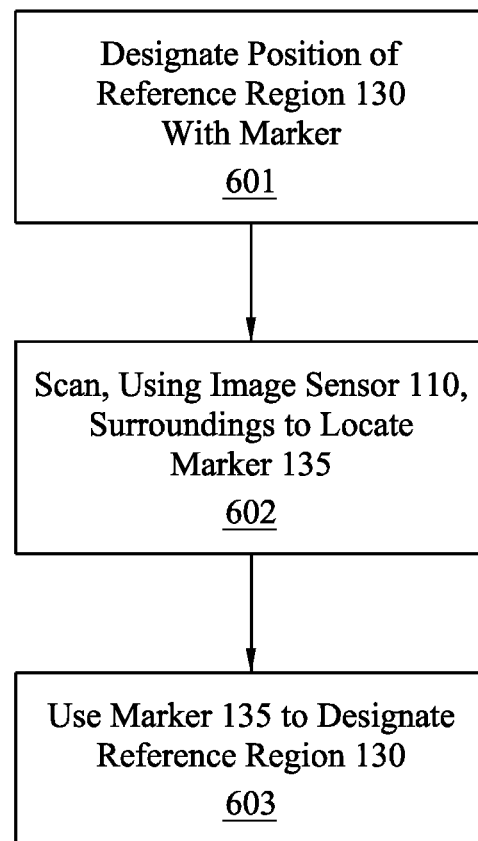
FIG. 17 is an exemplary flow chart illustrating an alternative embodiment of the method of FIG. 12 for positioning an image sensor with respect to a reference region, wherein the position of the reference is designated by a marker.

Turning now to FIG. 17, an alternative method 600 of automatically moving an image sensor 110 so that a reference region 130 is within the field-of-vision of the image sensor 110 is shown. In this embodiment, the position of the reference region 130 is not recorded by the image processor 120 (shown in FIG. 1), but is marked with a marker 135 that is recognizable by the image processor 120. This embodiment has an advantage that the location of the reference region 130 can be easily moved as needed, but may be more computationally intensive than recording the location of the reference region 130.

At 601, the position of the reference region 130 is designated using a marker 135. Preferably, the marker 135 is sufficiently distinctive so that it is easily distinguished from its surroundings by the image processor 120. In a preferred embodiment, the marker 135 can be a quick response (QR) code, a two-dimensional barcode encoding machine-readable information. As discussed above with reference to FIGS. 5-6, a QR code can include dark-colored modules arranged in a square grid, preferably on a background that provides color contrast, which can be "read" by the image sensor 110 and its content deciphered by the image processor 120. Various methods are known for computer reading of a QR code. For example an image of a QR code can be processed using Reed-Solomon error correction so that the image of the QR code can be appropriately interpreted.

At 602, the image sensor 110 scans the surroundings of the image sensor 110 until the marker 135 (for example, a QR code) is located. The method 600 can vary depending on the manner by which the image sensor 110 is attached to other portions of the imaging system 100, as some attachments afford a greater degree of mobility than others. In a simple case, the image sensor 110 can only move about a single degree of freedom (for example, image sensor 110 can only tilt up and down or swing from side to side). In this case, the image sensor 110 can optionally move through its full range of motion to locate the marker 135. In other cases, the range of motion that the image sensor 110 undertakes to locate the marker 135 can be restricted. Such restrictions can be angular and/or linear displacement restrictions (for example, the image sensor 110 is not allowed to move more than twenty degrees or two inches from its original location to find marker 135). Such restrictions can also specify, for example, a particular direction that the image sensor 110 should move to find the marker 135 (for example, the restriction can be that the image sensor 110 can only move up but not down, or rotate left but not right). In more complex cases where the image sensor 110 can move about multiple degrees of freedom, the image sensor 110 can be constrained (for efficiency, for example) to move only in one or more selected degree(s) of freedom to find the marker 135. Furthermore, a particular sector (in terms of angular coordinates) in which the image sensor 110 should scan for the marker 135 can be designated. The scanning by image sensor 110 of any particular region or section for the marker 135 is preferably systematic. For example, the image sensor 110 can be configured to scan through a full range of motion in one direction, move a fixed amount in another direction, and again scan through a full range of motion in the first direction.

At 603, the image sensor 110 has located the marker 135 and can use the marker 135 to designate the reference region 130. The marker 135 can be excluded from the image of the reference region 130 for purposes of computing a parameter for white balancing, as the distinctive color and pattern of the marker 135 can introduce bias in what would otherwise be a neutrally-colored (for example, white, middle-gray, or other gray tone) region. In one embodiment, the marker 135 can be positioned at the center of the reference region 130, and the image processor 120 (shown in FIG. 1) can be configured to capture a region within a specified distance from the marker 135. In another embodiment, the marker 135 encodes information regarding boundaries 138 (shown in FIG. 6) of the reference region 130. In another embodiment, the marker 135 is located at the boundary 138 of the reference region 130. In this embodiment, the marker 135 being located at the boundary 138 of the reference region 130 can be encoded in the marker or recorded on the image processor 120. In some embodiments, multiple markers 135 can be used to delimit one or more boundaries 138 of the reference region 130. Thus, through a combination of the placement of markers 135 and information encoded in the markers 135, the boundaries of the reference region 130 can be fully specified.

Figure 18:
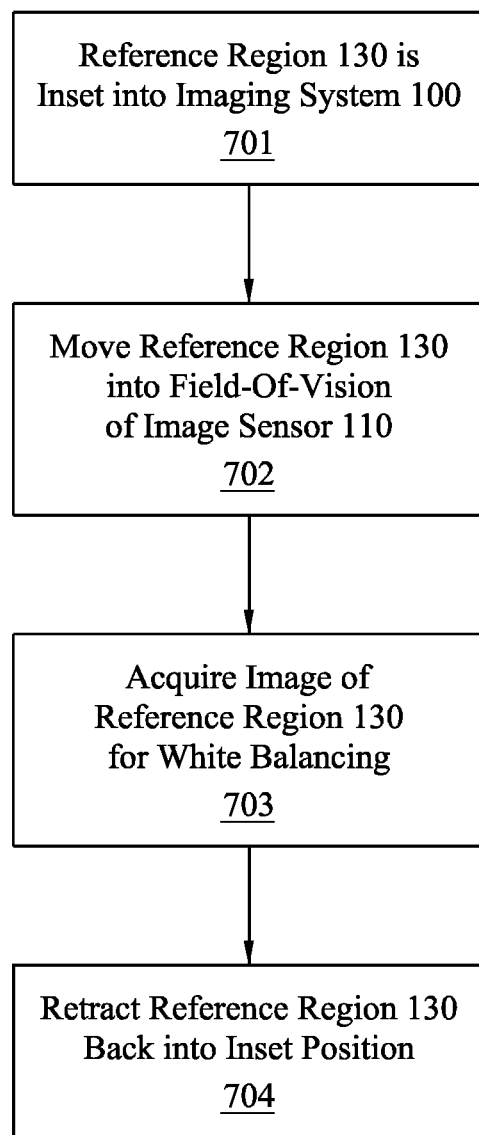
FIG. 18 is an exemplary flow chart illustrating another alternative embodiment of the method of FIG. 12 for positioning a reference region with respect to an image sensor.

Turning now to FIG. 18, an embodiment of a method 700 of automatically moving a reference region 130 into a field-of-vision of an image sensor 110 is shown. An advantage of method 700 is that this method can be used where the image sensor 110 is immobile or where moving the image sensor 110 is impractical (for example, where movement of the image sensor 110 is too slow or the image sensor 110 is too large to move). In such cases, the reference region 130 can be coupled with the imaging system 100 (shown in FIG. 1) and rendered mobile by various mechanical means (such as motors, ball bearings, tracks, springs, and the like).

Thus, at 701, the reference region 130 is inset into a portion of the imaging system 100 and not situated within the field-of-vision of the image sensor 110. At 702, in response to a white balancing trigger (as described above with reference to FIG. 3 and FIG. 4), the reference region 130 is moved into the field-of-vision of the image sensor 110 and partially or completely occupies the field-of-vision. At 703, image sensor 110 acquires an image of the reference region 130 for white balancing. At 704, the reference region 130 can be retracted back to an inset position after image acquisition of the reference region 130 is completed. In embodiments where the imaging system 100 includes a UAV 150 (shown in FIGS. 10-11), the reference region 130 can, for example, be inset into the fuselage 151 (shown in FIGS. 10-11) of the UAV 150. Under normal operations of the UAV 150, the reference region 130 can be at least partially inset into the fuselage 151 so that its exterior is flush with an exterior surface 153 (shown in FIGS. 10-11) of the fuselage 151. The reference region 130 can be ejected outward into the field-of-vision of the image sensor 110 for white balancing, and then re-inserted into the fuselage 151 after the reference region 130 has been imaged.

Figure 19:
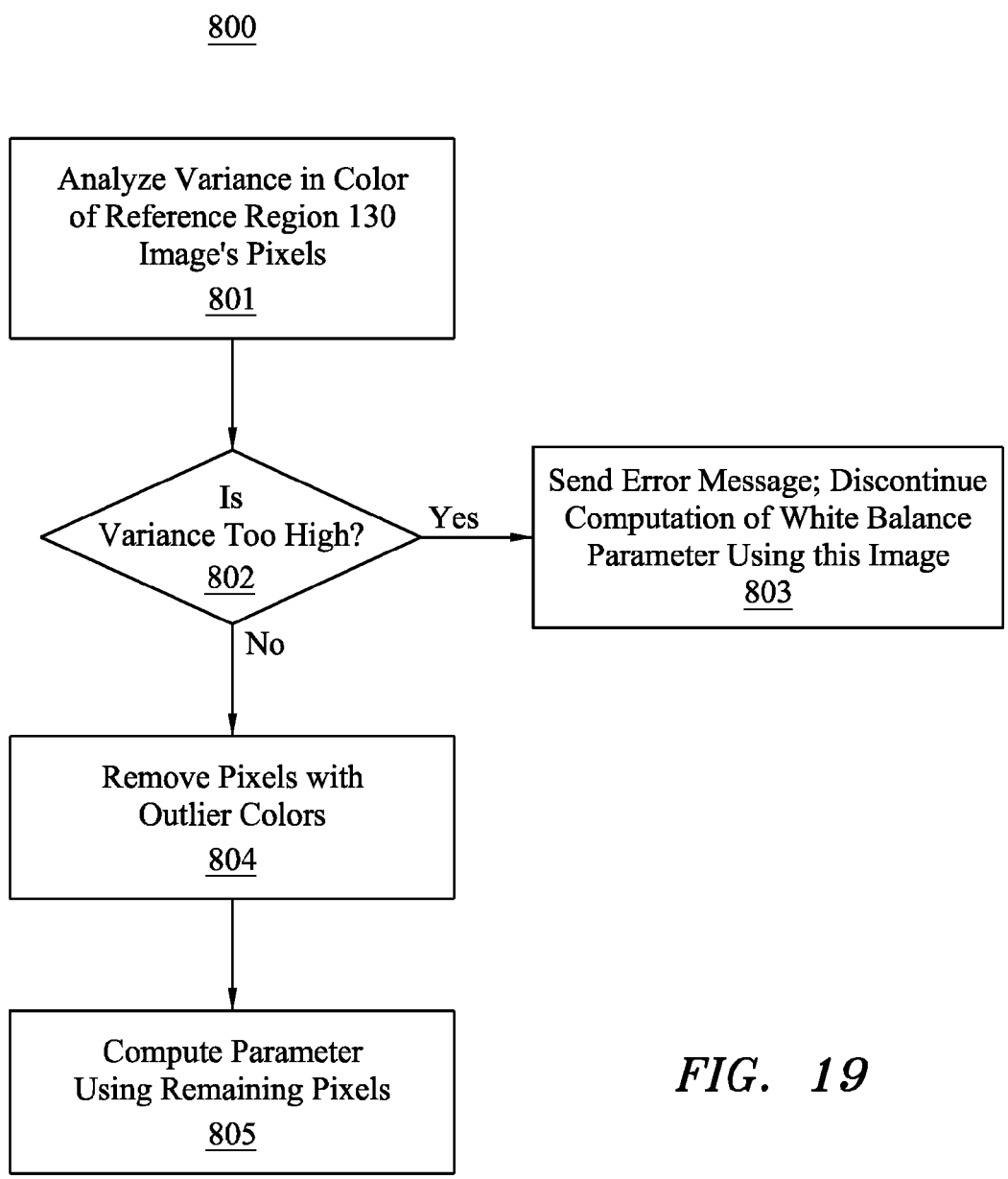
FIG. 19 is an exemplary flow chart illustrating an embodiment of a method for computing a parameter for white balancing using the method of FIG. 12.

Turning now to FIG. 19, an embodiment of a method 800 for computing a parameter for white balancing using an image of a reference region 130 is shown. Although a reference region 130 can be uniformly colored by design, heterogeneity in an image of reference region 130 may include artifacts that are likely to significantly bias the resulting white balancing parameter. Heterogeneity in the reference region image can be caused, for example, if the reference region 130 is tarnished or simply dirty from excessive use and/or adverse weather conditions. Heterogeneity can further be caused by malfunctions in the imaging hardware and/or bugs in the image processing software. In either case, a test for homogeneity of the reference region image can increase the reliability of the automatic white balancing process.

Thus, at 801, the color variance of the pixels of the image of the reference region 130 is analyzed. At 802, it is determined whether the color variance is too high (for example, the variance exceeds a predefined threshold). If the color variance is too high, which can indicate that the image color is too heterogeneous for effective white balancing, at 803, the imaging system 100 can send a warning message to a receiving system (not shown) or user (not shown) that white balancing using the reference region 130 may be unreliable. The imaging system 100 can optionally discontinue subsequent steps for computing the white balancing parameter using this particular image of the reference region 130. The imaging system 100 can attempt to perform white balancing by taking subsequent images of the reference region 130 and calculating the color variance of the subsequent images. If the color variance of the subsequent images is still too high, then the imaging system 100 can attempt to use a second reference region (not shown) for white balancing if such a second reference region is available to imaging system 100.

Even if the variance of the image of the reference region 130 has a suitable degree of homogeneity, the image may contain pixels having color artifacts that need to be removed. For example, to avoid biases in color temperature assessment that may result from pixels having outlier colors, such outlier pixels may be removed at 804 and the remaining pixels assessed for color temperature (for example, by taking an average of the remaining pixels) at 805. Various statistical techniques can be used for outlier pixel removal, such as removing a fixed percentile (for example, 2%, 5%, 10%, 15%, or more) of the highest and lowest color-temperature pixels.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method for automatically white balancing a digital image, comprising:
   in response to a white balancing trigger, automatically adjusting relative positions of an image sensor and a reference region having a color compatible for white balancing such that the image sensor is positioned to acquire an image of the reference region; and
   white balancing the digital image based on the image of the reference region acquired using the image sensor.

2. The method of claim 1, wherein said automatically adjusting comprises adjusting the relative positions in response to the white balance trigger being a determination that the digital image lacks a region suitable for use as a white balancing reference.

3. The method of claim 1, wherein said automatically adjusting comprises adjusting the relative positions in response to the white balance trigger comprising a user command.

4. The method of claim 1, wherein said automatically adjusting comprises automatically moving the image sensor such that the reference region is within the field-of-vision of the image sensor.

5. The method of claim 4, further comprising recording the position of the reference region prior to said automatically adjusting and moving the image sensor according to the recorded position of the reference region.

6. The method of claim 5, wherein said automatically adjusting comprises enabling the image sensor to scan surroundings of the image sensor to locate the reference region.

7. The method of claim 6, wherein said enabling the image sensor includes enabling the image sensor to locate the reference region by recognizing one or more markers on the reference region.

8. The method of claim 1, wherein said automatically adjusting comprises automatically moving the reference region into the field-of-vision of the image sensor.

9. The method of claim 1, further comprising automatically restoring the position of at least one of the image sensor and the reference region after acquiring the image of the reference region.

10. An imaging system, comprising:
    an image sensor for acquiring a digital image; and
    an image processor for white balancing the digital image based on an image of a reference region having a color compatible for white balancing,
    wherein the image processor is configured to, in response to a white balancing trigger, automatically adjust the position of the image sensor relative to a position of the reference region such that the image sensor is positioned to acquire the image of the reference region.

11. The imaging system of claim 10, wherein said image sensor is operatively mounted to a gimbal mechanism for rotating said image sensor about at least one axis.

12. The imaging system of claim 10, wherein the white balance trigger comprises a determination by the image processor that a digital image of interest lacks a region suitable for use as a white balancing reference.

13. The imaging system of claim 10, wherein the white balance trigger comprises a user command.

14. The imaging system of claim 10, wherein said image processor is configured to move said image sensor such that the reference region is within a field-of-vision of said image sensor.

15. The imaging system of claim 14, wherein said image processor is configured to direct said image sensor to scan its surroundings to locate the reference region.

16. The imaging system of claim 15, wherein the image sensor is configured to locate the reference region by recognizing one or more markers of the reference region.

17. The imaging system of claim 10, wherein said image processor is configured to move the reference region into a field-of-vision of the image sensor.

18. The imaging system of claim 10, wherein the image processor is configured to automatically restore the position of at least one of the image sensor and the reference region.

19. An apparatus, comprising:
    a mechanism for automatically adjusting, in response to a white balancing trigger, a position of an image sensor relative to a position of a reference region having a color compatible for white balancing such that the image sensor is positioned to acquire an image of the reference region.

20. The apparatus of claim 19, wherein said mechanism comprises a gimbal mechanism.

* * * * *